United States Patent [19]

Cogliano

[11] 4,448,830
[45] May 15, 1984

[54] CONSTRUCTION BARRIER BOARD

[75] Inventor: Joseph A. Cogliano, Pasadena, Md.

[73] Assignee: W. R. Grace & Co., New York, N.Y.

[21] Appl. No.: 402,748

[22] Filed: Jul. 28, 1982

[51] Int. Cl.³ .......................... B32B 1/04; B32B 3/02; B32B 3/12; B32B 11/04
[52] U.S. Cl. ........................................ 428/40; 428/78; 428/214; 428/215; 428/224; 428/245; 428/284; 428/317.1; 428/317.3; 428/317.7; 428/318.4; 428/355; 428/489
[58] Field of Search ................... 428/40, 304.4, 306.6, 428/312.6, 314.4, 314.8, 316.6, 317.1, 317.3, 317.7, 318.4, 318.6, 355, 489, 490, 491, 77, 78, 214, 215, 224, 245, 284

[56] References Cited

U.S. PATENT DOCUMENTS

| | | | |
|---|---|---|---|
| 3,483,664 | 12/1969 | Funk et al. | 428/317.1 |
| 4,045,265 | 8/1977 | Tajima et al. | 428/319.1 |
| 4,169,915 | 10/1979 | Heitmann et al. | 428/318.4 |
| 4,172,830 | 10/1979 | Rosenberg et al. | 428/489 |
| 4,186,236 | 1/1980 | Heitmann | 428/489 |
| 4,357,377 | 11/1982 | Yamamoto | 428/311.5 |

Primary Examiner—William J. Van Balen
Attorney, Agent, or Firm—Howard J. Troffkin

[57] ABSTRACT

A preformed sheet-like barrier useful for drainage enhancing away from and waterproofing of a structure, said barrier is formed from an open cell porous structure having an adhesive bituminous sheet integrally adhered to one major surface of the structure and having a removable coating substantially coextensive and congruent with the free surface of the bituminous sheet.

20 Claims, 7 Drawing Figures

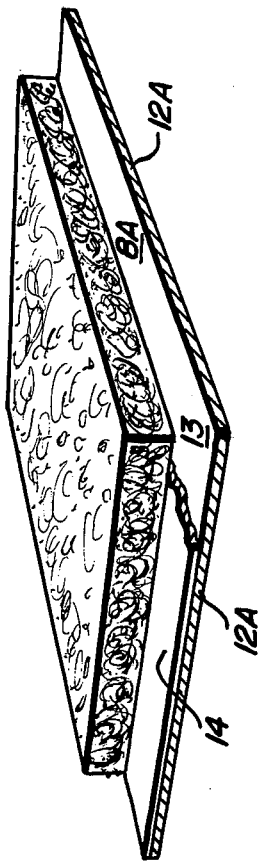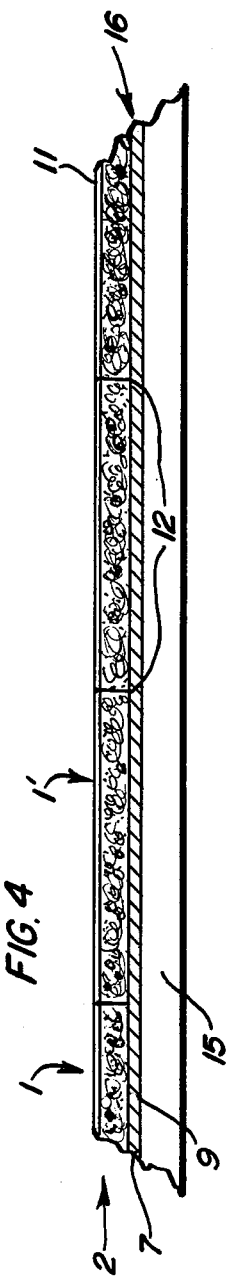

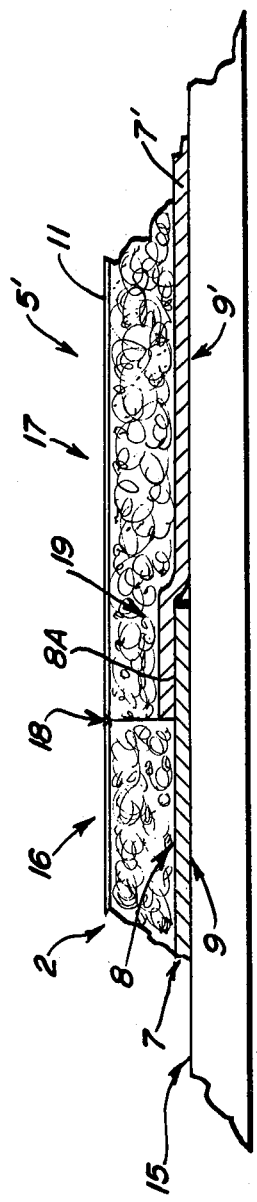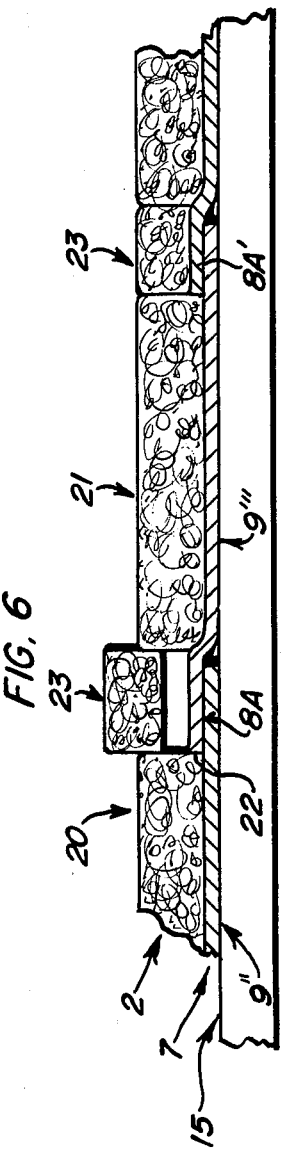

CONSTRUCTION BARRIER BOARD

BACKGROUND OF THE INVENTION

The present invention is directed to a barrier structure useful in the construction industry. More specifically, the presently disclosed barrier structure is a unitary product capable of being readily applied on exterior structural surfaces, such as foundation walls, as a water drainage enhancer/waterproofing barrier.

Barrier protection of structural foundations is conventionally formed by parging the foundation's exterior surface with a waterproofing paint or cement or an asphaltic composition. This must be carefully done to assure that it fully covers the foundation surface and does not leave gaps which would permit water seepage through the foundation wall. When drainage enhancement is desired, this is normally accomplished by placing drainage tile or pipe at the foundation footing and installing gravel or the like over the tile and against the parged foundation wall during backfill. Formation of such a barrier is labor intensive, requires use of heavy material and, therefore, heavy equipment, and the installation of the gravel tends to chip and break the formed waterproofing membrane.

It is desired to have a material capable of forming a combined drainage means and water barrier which can be easily applied with minimum amount of labor and time.

SUMMARY OF THE INVENTION

The present invention is directed to a barrier structure useful in the construction industry and the like. The present barrier structure is capable of forming a moisture barrier/drainage enhancing means. The subject barriers can be applied with a minimum amount of labor and time to structural surfaces.

Specifically, the instant invention is a preformed barrier structure composed of a porous, substantially planar board having an open-pore structure, and having a first and a second major face and edges defining the dimensions of said porous structure and, in contact with and self-adhered to substantially the entire first major face of the porous structure, is an adhesive bituminous sheet material. It is preferred that the bituminous sheet be of a dimension such that at least two of said sheet edges extend beyond the edges of the porous board.

BRIEF DESCRIPTION OF DRAWINGS

FIG. 3 is an oblique view of the subject barrier with extended membrane surfaces.

FIG. 4 is a cross-sectional view of the barrier applied to a structural surface.

FIG. 5 is a cross-sectional view of the barrier of FIG. 3 as applied to a structural surface.

FIG. 6 is a cross-sectional view of a barrier having membrane extended on opposite or all sides as applied to a structural surface.

DETAILED DESCRIPTION OF THE INVENTION

The subject invention is directed to a composite structure suitable for use as a barrier in the construction industry. The barrier is described by referring to the numbered elements of the Figures. The barrier structure (1) comprises a porous, substantially planar member having one of its major surfaces covered with an adhesive bituminous sheet material.

Figure 1:
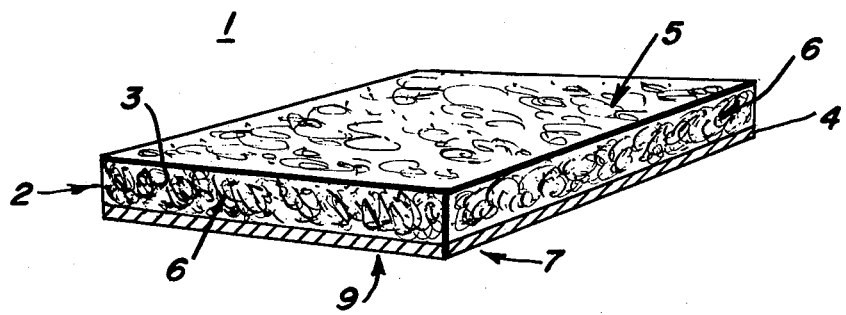
FIG. 1 is an oblique view of one embodiment of the subject barrier.
Figure 2:
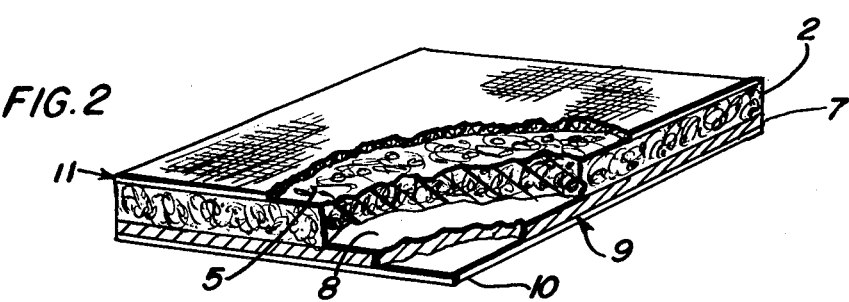
FIG. 2 is an oblique cut away view of one embodiment of the subject barrier.

Referring to FIGS. 1 and 2, the porous structure (2) suitable for use in the instant invention is a substantially rigid, substantially planar sheet-like structure having a plurality of pores therein. The term "rigid" shall mean a material which has a limited amount of flexibility and shall apply to structures which may be bent to small degrees by the application of force. The specific amount of flexure will depend upon the dimensions of the structure. It is preferred that the porous structural member (hereinafter called a "porous board") be capable of retaining its planar configuration with respect to its major faces. The planar configuration of the porous board will permit the ultimately formed barrier of this invention to be placed on and secured, as described below, to planar structural members, such as a roof deck or foundation walls. In certain instances, it may be desired to have the rigid porous board in certain predetermined nonplanar configuration which conforms to the configuration of the structural surface to which it will be ultimately applied.

The porous board (2) can be formed from any conventional open cellular material. Open cellular material comprises materials having interconnected cells (3) throughout the board and which, thereby, form tortuous paths from surface to surface throughout. Such open cellular material are cellular polymeric foams including those formed from polystyrene foams having interconnecting voids, urea-formaldehyde, phenol-formaldehyde, polyurethane and the like. Porous board of an open cellular configuration can also be formed from random fibrous batting such as rigid fiberglass batting or from polymer modified asphalt foams.

The barrier of the instant invention is usually applied to foundation walls and the like as a combined waterproofing/drainage enhancing means. The barrier is adhered to the foundation wall by contacting the free major surface of the adhesive sheet material, as more fully described below, to the wall. The open cell porous board is then on the free side of barrier and will be adjacent to the backfill surrounding the foundation. Normally, barriers are applied over an area of the foundation from its bottom to an area close to the estimated level of the surface of the backfill. Conventional drainage tile or pipe can be located at the base of the applied barrier, such as at the footing of the foundation, to carry the water away. The present barrier construction causes water impermeability via the applied membrane and permits ready movement and removal of any water concentrating at the foundation to reduce and prevent hydrostatic pressure build up.

The porous board has a first (4) and a second (5) major surface and edges (6) which define its dimensions. The porous board may be of any desired shape. It is preferred that the board configuration (which controls the configuration of the barrier) is of a quadrilateral parallelogram, such as a rectangle or square. Boards, and thereby barriers, of any convenient dimension for the construction industry or for the particular application can be formed, such as boards which are from about 1 to 6 feet (preferably from 2 to 4 feet) wide and from 1 to 12 feet (preferably from 2 to 10 feet) long. The thickness of the board can vary from about 0.25 to 10 inches (preferably from about 0.5 to 4 inches). The subject barrier being normally formed of substantially light materials can be of large dimensions to cover, in one step, a large expense of structural surface.

In a preferred embodiment, the second major surface (5) has adherently attached to it a fibrous cloth or mat formed from woven or non-woven organic or inorganic natural or synthetic fibers. The cloth or mat should have a porosity substantially smaller than that of the porous board and sufficient to inhibit intrusion of dirt and gravel particles into the pores of the barrier's board. The mat or cloth can be adhered to the board in known manners, as by heat bonding of thermoplastic materials (where appropriate) or by aid of a mastic.

The open cell porous board is securely self-adhered to a preformed adhesive non-porous sheet material (7) such as a preformed adhesive bituminous sheet material to form the barrier of the present invention. The barrier forms a water drainage enhancer/waterproofing barrier which can be readily applied to structural surfaces such as foundation walls and exterior walls to provide a one step installation means.

The preformed non-porous sheet (7) is directly adhered to the porous board (2). The adhesive sheet (7) will be described herein in terms of the preferred material, an adhesive bituminous membrane. The membrane or adhesive bituminous sheet material to which the porous board is directly adhered can be formed from any bituminous material which has adhesive properties at least with respect to each of its major surfaces. Bituminous (The term "bituminous" and "bituminous composition" is used in this specification and appended claims to define compositions formed from a bitumen, asphalt, tar or pitch base.) sheet products which have adhesive properties are known and are formed from blends of bituminous material and a natural or/and synthetic rubber or resin. These blends can be formed with a natural or synthetic rubber which is virgin or reclaimed to provide a smooth mix. The synthetic rubber can be, for example, styrene-butadiene rubber (SBR), acrylonitrile-butadiene rubber (NBR), chloroprene rubber (CR), isoprene rubber (IR), butyl rubber (IIR), and the like. The ratio by weight of bituminous material to rubber is generally from about 80:20 up to about 95:5 and preferably from about 85:15 to 95:5. Generally, suitable compositions have a softening point (Ring and Ball method) of 60° to 140° C. and preferably 60° to 110° C. and a penetration value of 50 to 400, preferably 150 to 300 at 25° C. (100 g. 5 sec. - I.P. method).

The preformed adhesive sheet material suitable for use in the present invention can have a laminate structure formed from a multiple of layers provided that the laminae forming each of the major surfaces of the sheet product is formed of an adhesive composition. Further, the adhesive bituminous sheet formed from a single or multiple layers, as described above, can have embedded therein a web or cloth formed from a woven or non-woven organic or inorganic, natural or synthetic fibers (staple or continuous filament) such as glass, hessian, cotton, or synthetic polymers, polyolefins, polyamides, polyesters (polyethylene terephthalate), polyurethane and the like. The fibrous web or cloth should be of a thickness not greater than about half, preferably less than one quarter the thickness of the bituminous sheet material (7).

The bituminous sheet has two major surfaces and edges which define its dimensions. The sheet should be at least 0.01 inch (0.025 cm) thick, preferably 0.025 to 0.2 inch (0.063 to 0.5 cm). The thicker the bituminous sheet the better the waterproofing effect but, in general, a sheet of from 0.025 to 0.15 inch (0.063 to 0.4 cm) thick is satisfactory for most application.

The sheet's first major surface (8) is superimposed on and at least coextensive with the first major surface (4) of the porous board (2). The sheet (7) is in direct contact with the porous board and the adhesive properties of the first major surface (8) of the sheet causes the composite to be a unitary structure.

The barrier can be stored, transported and sold with a protective sheet coating (10) coextensive and congruent with the second major surface (9) of its adhesive bituminous sheet to aid in handling. This surface (9) will, upon removal of the protective coating (10) at the construction site, be applied to the structural surface to be sealed. The protective coating (10) is in the form of a sheet product, such as siliconized paper, polymer film, cloth or the like sheet product treated with a release agent so that it is substantially non-adherent with respect to the adhesive sheet's second major surface (9) ("substantially non-adherent" means herein and in the appended claims to be readily removable from the adhesive sheet's second major surface without causing damage). The release agent used in conjunction with the coating sheet (10) can be any commercial release agent such as a dispersion of a silicon compound, for example, a dispersion of poly(dimethyl siloxane).

Figure 2A:
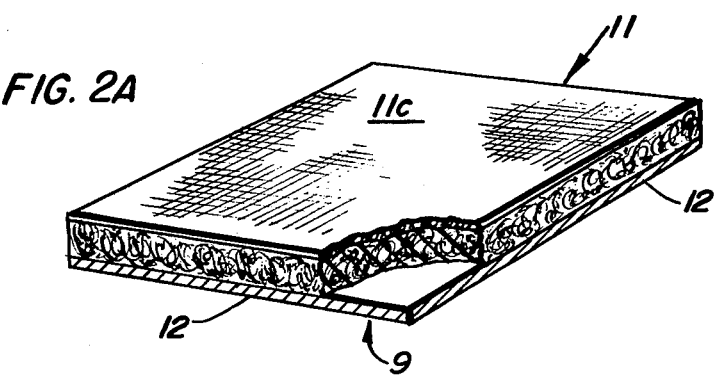
FIG. 2A is an oblique cut away view of a second embodiment of the subject barrier.

FIG. 2A depicts the subject barrier in a preferred mode with a fibrous cloth (11) adhered to the second major surface (5) of board (2) to inhibit plugging of the pores by foreign matter. The barrier (1), with or without the fibrous cloth (11), can be stored, transported and sold with a coating (11C) of a non-adherent composition with respect to the adhesive sheet (7) such as of a release agent as described above. The coating (11C) is a film of release agent containing composition applied directly to surface (5) or to the combination of 5 and 11 (when the cloth (11C) is used) by conventional application such as by spraying, brushing or the like. The film can be very thin and normally need not be greater than about 5 mils thick. Greater thickness may be applied but normally does not add to the non-adherent properties. The second major surface (9) of the adhesive sheet (7) is thus free for direct application to the construction surface. When the subject barrier (1) has a film coating of release agent (11C) on the second major surface (5) or (11) and (5) of its porous board (2), the barrier can be stored, transported and sold without problem by stacking the barriers so that the adhesive bituminous sheet of one barrier is coextensive and congruent with the release coating on the porous board free surface of another barrier which in turn is coextensive and congruent to still another barrier in the same manner. The bottom element of the stack should be a release coating treated board or the like without a membrane. In this embodiment, the protective coating (11C) is an integral part of the barrier and need not be removed and disposed of at the construction site. The barriers can be each removed from the storage stack and directly applied to the structural surface.

The adhesive bituminous sheet (7) has dimensions of length and breath defined by its edges (12). The sheet may be of a dimension such that it is coextensive and congruent with that of the porous board (2) with which it forms a composite barrier (1) as shown in FIG. 1.

In another embodiment as shown in FIG. 3, the sheet has dimensions such that it covers all of one surface of the porous board (2) and extends, with respect to at least two edges (12A), beyond that of the coordinate (spacially close and substantially parallel) edges of the porous board. In this manner the sheet shall have an overhang with respect to at least two edges and thus provide a means for overlapping at the junctures of the applied barriers over the entire expanse of the structural surface. The two extended edges (12A) of the sheet of any one barrier board can be adjacent edges, that is edges which meet at one corner area (13) of the barrier. Alternately (not shown) the extended edges (12A) can be parallel to each other (for example, on opposite sides of a quadrilateral parallelogram) or the sheet edges can extend on all sides with respect to the porous board of the barrier.

The extended portions of a bituminous sheet of any one barrier will have the associated extended portion (8A) of its first major surface (8) exposed. To aid in handling during storage, transportation, etc. this exposed portion (8A) of the first major surface should be covered with a coating sheet (14) similar to that described above with respect to the coating sheet (10) for the membrane's second major surface (9). The coating (14) should be treated with a release agent, as described above, to permit its ready removal. This release agent should, preferably, impart non-adherent properties to a lesser degree in comparison to that used on the protective coating for the membrane's second major surface. Such agent could be, for example, a modified poly(-dimethyl siloxane) having a fraction of the methyl groups replaced by hydrogen, a higher alkyl or a phenyl group.

When the barrier is supplied with a protective coating (11C) as an integral part of the second major surface (5) of the porous board (2) or over the combination of surface 5 and cloth 11 and the barrier is of a configuration having extended portions (8A) of its bituminous sheet, the protective coating should also cover the edge surfaces (6) of the board (2) and should be on both surfaces of the coating sheet (14) which covers the exposed portion (8A) of the first major surface of the bituminous sheet. In this manner the extended portion of the bituminous sheet can drape downwards over the edge surface and even (depending on its dimensions) of the protected surface of extended bituminous sheet of lower barriers in a stack of barriers during storage, etc. The extended free surface of bituminous sheet component of any one barrier will only be in contact with a protective coating (i.e. a release agent coating) providing protection during storage, transportation, etc., providing ready separation and removal of any one barrier from the storage stack and providing ready application without requiring removal and disposal of large quantities of protective sheet product.

The bituminous sheet component of the barrier can extend beyond the porous board for about 1 to about 10 inches or more, preferably from 2 to 8 inches to permit overlapping with a sheet of the next applied subject barrier and to permit extended adhesive to adhesive contact to assure forming a secure watertight seal.

The application of the subject barrier can be readily done without the need for extensive labor or the use of extensive equipment and material as is normally required in applying a composite roof or wall structure.

Referring to FIG. 4, when the barrier is supplied in the form of a bituminous sheet and porous board which are coextensive and congruent to each other as shown in FIG. 1, it is applied to the surface of the structure to be protected by removing the protective coating (10) to expose the second major surface (9) of the adhesive sheet (7) of a barrier (1) and position and apply the barrier to the structural surface so that the exposed surface (9) of the sheet (7) is in contact with the structural surface (15). In the same manner the protective coating on the sheet of another barrier (1') is then removed to expose the second major surface of its adhesive sheet. This barrier is positioned and applied to the structural surface adjacent to that of the previously applied barrier in a manner to have the bituminous sheet of the newly placed barrier adjacent to the porous board of a previously placed barrier. The steps are repeated until the entire surface is covered. The barriers are placed adjacent to and in contact with the barrier forming the prior layed course. Such placement of barriers formed of adhesive sheet and porous board which are coextensive permits and causes each of the edge surface (12) of one barrier's adhesive sheet to butt up against an adjacent edge surface (12) of the next barrier's adhesive sheet. Due to the adhesive property of each sheet and their ability to flow to a small degree even under ambient temperatures, the abutting edges will self-adhere, form a water-tight seal and form a unitary waterproofing membrane structure (16) over the entire structural surface to which it is applied.

Referring to FIG. 5, the subject barrier which has two edges of its sheet component meeting at one corner area and extended beyond the porous board can be applied to structural surfaces in a manner to cause overlapped seams. This is a preferred embodiment of the subject invention. Such barrier product is applied in the same manner as described above for the coextensive and congruent sheet/porous board barrier product. One barrier (16) is applied by removing, when applicable, the protective coating (10) from the second major surface (9) of the bituminous sheet (7) of one barrier to expose the adhesive surface, positioning and applying the barrier to the structural surface so that the sheet's exposed second major surface (9) is in contact with the structural surface (15), and then removing the protective coating (14) from the extended first major surfaces (8A). One then applies a second barrier (17) by removing its protective coating from its sheet's second major surface (9'), applying the second barrier (17) to the exposed extended first surface (8A) of the sheet (7) of the first barrier (16) and to the adjacent structural surface so that the porous boards of the first and second barriers are adjacent to and in contact with each other at seam 18 and so that the sheet (7') of the second barrier (17) is adjacent to the porous board (2) of the first barrier (16) at seam 18. The sheets of the first and second barriers will thereby overlap. The protective coating of the extended portion of the first surface of the second barrier's sheet component is removed. The process is repeated until the surface of the structure to be protected is covered. This provides overlap seams between each of the applied barrier sheet components with extended adhesive to adhesive contact to assure waterproof seams and form a unitary membrane structure.

The barrier of this embodiment can be applied to form a substantially flat total structure if the porous board of the barrier has edge areas (19) (area extending for a short distance of at least about equal or greater than the extended sheet width dimension, such as from about 1 to about 10 inches from any of the porous board's edges and extending the full length of the edge which is not associated with an extended membrane portion) wherein the second major surface (5') of the porous board (that not in contact with the adhesive bituminous sheet) is substantially planar and the first and second major surfaces of the porous board are in closer spacial relationship at the edge portion (19) than with respect to the remainder of the board. This will form an indenture (preferably about equal to the thickness of a sheet component of the barrier used) to accommodate the overlap of the two sheets. This is the most preferred embodiment of the subject barrier configuration.

The embodiment of the subject barrier described hereinabove wherein the sheet component of the barrier extends on opposite sides of the porous board and substantially parallel to each other or wherein it extends beyond the porous board on all sides is applied, as shown in FIG. 6, by first removing the coating from the second surface (9") of the sheet of a first barrier (20), positioning and applying the first barrier (20) to the structural surface (15), removing the coating from the extended portion (8A) of first major surface (8) of the sheet (7) of the first barrier (20), removing the protective coating from the second major surface (9''') of the sheet component of a second barrier (21), positioning and applying the second barrier (21) so that one of its sheet's extended edges (22) is adjacent to the porous board (2) of the first barrier (20) and its sheet's second major surface covers at least a portion of the extended surface (8A) of the first surface of the sheet component (7) of the first barrier (20) (to form an overlap seam) and the adjacent structure surface, removing the protective coating from the extended first major surface (8A') of the second applied barrier (21) and repeating until the entire surface is covered. The exposed overlap seams can then be covered with filler sections (23) formed from porous board of the same type used to form the barrier. The filler sections should be of a thickness approximately equal to the thickness of the barrier less twice the thickness of the barrier's sheet component. Alternately, certain filler sections of any one barrier can be supplied as part of a barrier as temporarily adhered to half of the extended sheet surfaces (8A). These sections (23) thereby act as a guide to aid in applying the barrier to adjacent barriers of proper spacing. Each filler section (23) can be removed to permit rolling of the overlap adhesive sheets to insure forming of a watertight seal there between and then replaced in the vacant space. The temporary adhesion of each filler section (23) to the extended sheet can be done by applying a release film to one surface of section 23 and reapplying section 23 with the release film treated surface away from the sheet membrane. Other methods can be readily determined by the artisan. The resultant structure will thereby be substantially flat.

While the subject invention has been described and illustrated in terms of certain preferred embodiments thereof, it is to be understood that the subject invention is not limited thereto or thereby.

What is claimed is:

1. A performed sheet-like barrier consisting essentially of (a) a substantially rigid, porous, open-celled, substantially planar structure having a first and a second major surface and edges defining the dimensions of said structure, said structure having a thickness of from about 0.25 inch to 10 inches;

(b) an adhesive bituminous sheet formed from blends of bituminous material and a natural or synthetic rubber or resin, said sheet having a first and a second major surface and edges defining the dimensions of sheet and having a thickness of at least 0.01 inch, wherein the first major surface of said sheet is in contact with and self adhered to the substantial entire first major surface of said porous structure;

(c) a coating which is substantially non-adherent with respect to said adhesive bituminous sheet, said coating being a removable sheet which is substantially coextensive and congruent with the second major surface of the adhesive bituminous sheet or said coating being a film of substantially non-adherent material applied to at least the substantial entire second major surface of said structure; said porous structure (a) and said sheet (b) are each substantially in the form of a quadrilateral parallelogram, each of two adjacent edges of said sheet extend beyond each of two adjacent edges of said porous structure, respectively, are in contact with each other at one corner section of the barrier and are substantially parallel to each of the two adjacent edges of said porous structure: and each of the two remaining adjacent edges of said sheet are substantially congruent with each of the two remaining adjacent edges of said porous structure, respectively.

2. A preformed sheet-like barrier consisting essentially of (a) a substantially rigid porous, open-celled, substantially planar structure having a first and a second major surface and edges defining the dimensions of said structure, said structure having a thickness of from about 0.25 inch to about 10 inches:

(b) an adhesive bituminous sheet formed from blends of bituminous material and a natural or synthetic rubber or resin, said sheet having a first and a second major surface and edges defining the dimensions of said sheet and having a thickness of at least 0.01 inch, wherein the first major surface of said sheet is in contact with and self adhered to the substantial entire first major surface of said porous structure;

(c) a coating which is substantially non-adherent with respect to said adhesive bituminous sheet, said coating being a removable sheet which is substantially coextensive and congruent with the second major surface of the adhesive bituminous sheet or said coating being a film of substantially non-adherent material applied to at least the substantial entire second major surface of said porous structure;

said porous structure (a) and said sheet (b) are each substantially in the form of a quadrilateral parallelogram, each of two adjacent edges of said sheet extend beyond each of two adjacent edges of said porous structure, respectively, are in contact with each other at one corner section of the barrier and are each substantially parallel to each of the two adjacent edges of said porous structure; each of the two remaining adjacent edges of said membrane are substantially congruent with each of two remaining adjacent edges of said porous structure, respectively; and said porous structure's first and second major surface each has an edge area which is coextensive with and extend in from each of the two remaining adjacent edges, the second major surface is substantially planar and the edge areas of the first surface of the porous board are in closer spacial relationship with the edge areas of the second surface than the remaining major portion of said first surface to the second surface of the porous structure.

3. A construction structure having a waterproofing and insulating barrier on at least a portion of its structural surface, wherein said barrier is a preformed sheet-like barrier consisting essentially of (a) a substantially rigid, porous, open-celled, substantially planar structure having a first and a second major surface and edges defining the dimensions of said structure, said structure having a thickness of from about 0.25 inch to about 10 inches;

(b) an adhesive bituminous sheet formed from blends of bituminous material and a natural or synthetic rubber or resins, said sheet having a first and a second major surface and edges defining said sheet and having a thickness of at least 0.01 inch, wherein the first major surface of said sheet is in contact with and self adhered to the substantial entire first major surface of said porous structure and said second major surface of said sheet is in contact with and adhered to a portion of the construction structure surface;

said porous structure (a) and said sheet (b) are each substantially in the form of a quadrilateral parallelogram, each of two adjacent edges of said sheet extend beyond each of two adjacent edges of said porous structure, respectively and each of the remaining adjacent edges of the sheet are substantially congruent with each of the two remaining adjacent edges of the porous structure of a barrier.

4. The barrier of claims 1, 2 or 3 wherein the second major surface of said porous structure (a) of a barrier is substantially completely covered with a fibrous cloth or mat.

5. The barrier of claims 1, 2 or 3 wherein the adhesive sheets extended edges extends from about 1 to about 10 inches beyond the adjacent edge of the porous structure of a barrier.

6. The barrier of claim 2 wherein two adjacent edges of said adhesive sheet extend from about 1 to about 10 inches beyond the adjacent edges of the porous structure and the edge portions of the porous structure extend from about 1 to 10 inches from said remaining edges.

7. The barrier of claim 1 or 2 wherein said coating (c) is a removable sheet which is substantially coextensive and congruent with the second major surface of the adhesive sheet (b).

8. The barrier of claim 1 or 2 wherein said coating (c) is a film of substantially non-adherent material applied to at least the substantial entire second major surface of the porous structure (a).

9. The barrier of claims 1, 2 or 3 wherein the porous structure (a) is formed from a composition selected from urea-formaldehyde foam, polyurethane foam, random fibrous batting or a polymer-modified asphalt foam.

10. The barrier of claim 7 wherein the portion of the first major surface of the adhesive sheet which extends beyond the porous structure is covered with a removable coating.

11. The barrier of claim 8 wherein the portion of the first major surface of the adhesive sheet which extends beyond the porous structure is covered with a removable coating.

12. The barrier of claims 1, 2 or 3 wherein the adhesive sheet (b) has a woven or non-woven web or cloth embedded therein.

13. The barrier of claim 4 wherein the adhesive sheet (b) has a woven or non-woven web or cloth embedded therein.

14. The barrier of claim 5 wherein the adhesive sheet (b) has a woven or non-woven web or cloth embedded therein.

15. The barrier of claim 6 wherein the adhesive sheet (b) has a woven or non-woven web or cloth embedded therein.

16. The barrier of claim 7 wherein the adhesive sheet (b) has a woven or non-woven web or cloth embedded therein.

17. The barrier of claim 8 wherein the adhesive sheet (b) has a woven or non-woven web or cloth embedded therein.

18. The barrier of claim 9 wherein the adhesive sheet (b) has a woven or non-woven web or cloth embedded therein.

19. The barrier of claim 10 wherein the adhesive sheet (b) has a woven or non-woven web or cloth embedded therein.

20. The barrier of claim 11 wherein the adhesive sheet (b) has a woven or non-woven web or cloth embedded therein.

* * * * *